United States Patent [19]

Hicks, Jr.

[11] Patent Number: 4,743,086
[45] Date of Patent: May 10, 1988

[54] COUPLING DEVICE FOR FORMING OPTICALLY EFFICIENT END-TO-END OPTICAL FIBER CONNECTIONS

[75] Inventor: John W. Hicks, Jr., Northboro, Mass.

[73] Assignee: Polaroid Corporation, Cambridge, Mass.

[21] Appl. No.: 677,933

[22] Filed: Dec. 3, 1984

[51] Int. Cl.$^4$ .............................................. G02B 6/26
[52] U.S. Cl. ............................. 350/96.15; 350/96.21; 350/320; 356/73.1
[58] Field of Search ................. 350/96.15, 96.21, 320; 356/73.1

[56] References Cited

U.S. PATENT DOCUMENTS

| | | | |
|---|---|---|---|
| 3,779,628 | 12/1973 | Kapron et al. | 350/96 |
| 3,825,319 | 7/1974 | Cook et al. | 350/96 |
| 3,900,245 | 8/1975 | Dyott et al. | 350/96 |
| 3,944,327 | 3/1976 | Larsen | 350/96 |
| 4,011,005 | 3/1977 | Hawkes et al. | 350/96 |
| 4,060,308 | 11/1977 | Barnoski et al. | 350/96.15 |
| 4,178,067 | 12/1979 | Johnson et al. | 350/96.21 |
| 4,200,356 | 4/1980 | Hawkes et al. | 350/96.16 |
| 4,236,786 | 12/1980 | Keck | 350/96.15 |
| 4,415,227 | 11/1983 | Unger | 350/96.15 |

FOREIGN PATENT DOCUMENTS

| | | | |
|---|---|---|---|
| 0198015 | 7/1983 | Japan | 356/73.1 |
| 0037503 | 1/1984 | Japan | 350/96.15 |

Primary Examiner—Gene Wan
Assistant Examiner—James C. Lee
Attorney, Agent, or Firm—Francis J. Caufield

[57] ABSTRACT

A coupling device for forming optically efficient end-to-end connections between optical fibers having a common core and cladding geometry but different relative dimensions and cross sections includes forming a segment of optical fiber having the same general geometry of the fibers to be coupled but which varies between relatively enlarged and reduced cross sections along its length. The coupling device is severed along its length at appropriate points to match the relative cross sections of each fiber to be coupled to thereby allow a butt type coupling between optical fibers of the same general geometry but with differing cross sectional areas. The coupling devices may be manufactured by drawing a starting fiber having the same geometry of the fibers to be coupled and varying the drawing speed to create enlarged and reduced cross section portions. The starting fiber may then be severed at the reduced cross section portions to provide the coupling device.

3 Claims, 2 Drawing Sheets

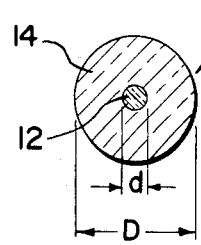
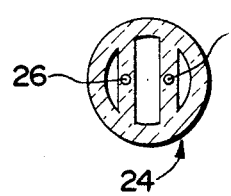
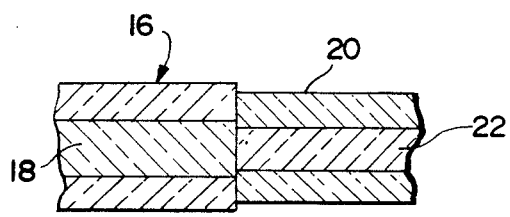
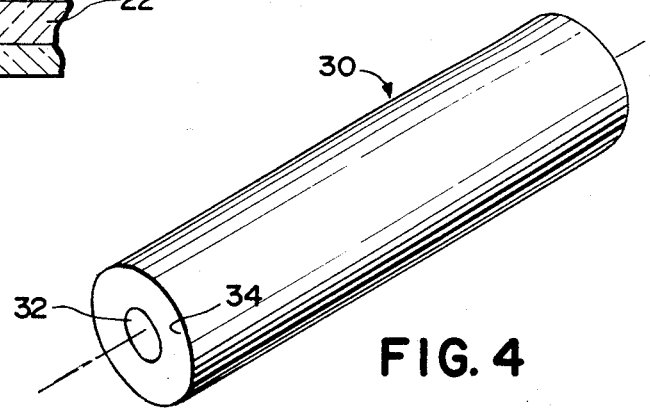
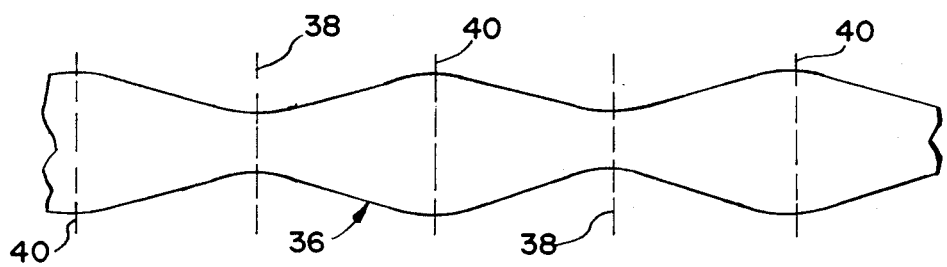

COUPLING DEVICE FOR FORMING OPTICALLY EFFICIENT END-TO-END OPTICAL FIBER CONNECTIONS

BACKGROUND OF THE INVENTION

The present invention relates generally to optical fiber waveguides. More particularly, it concerns methods and structures for efficiently coupling optical fiber waveguides having the same general cross sectional geometry but with cross sectional areas differing in size.

Optical fiber waveguides are well suited for high data rate transfer in both wide area and local area networks. Optical fibers typically include a core formed from a high purity glass-like silica with a glass-like silica cladding layer surrounding the core. The indices of refraction of the core and cladding are controlled during manufacture so that the index of refraction of the core is higher than that of the cladding to confine light energy to the core as it is propagated along the fiber. As compared to prior wire systems, optical fiber waveguides offer small diameter high data rate paths that are relatively immune to interference in electromagnetic environments.

In creating an optical fiber network, such as a telecommunications system, it is necessary that discrete optical fibers be efficiently coupled to one another. One common method of coupling, known as butt coupling, involves cleanly severing the to-be-coupled end of each optical fiber along a plane transverse to the long axis of the fiber. The two severed ends are then joined and maintained together in a core-to-core, cladding-to-cladding relationship so that light from the core of one of the fibers will be transferred into the core of the other fiber. Because the diameter of the cores can be relatively small, as low as 2-3 microns in the case of single-mode optical fibers, it is difficult to align the fibers in an optimum coaxial relationship. Moreover, any off-axis alignment error in the end-to-end butt coupling can result in significant light loss. In addition, the diameter dimensions of both the core and the cladding and their respective cross sectional areas can vary along the length of a fiber, from one fiber to another fiber fabricated by the same manufacturer, and from manufacturer to manufacturer. Potential dimensional variations can make efficient butt coupling difficult. For example, light energy can be lost when attempting to couple light from a relatively large diameter core to a relatively small diameter core, the light loss being related to the difference in cross sectional area between the two cores. Accordingly, a need arises for effecting efficient coupling between optical fibers in such a way that dimensional differences between the coupled fibers can be accomodated.

SUMMARY OF THE INVENTION

In accordance with the present invention, optical fibers having differing core and cladding dimensions can be coupled efficiently by fabricating a coupling device in the form of an optical fiber segment having the same general core and cladding geometry as that of the two fibers to be coupled but with the core and cladding dimensions, and their corresponding cross sectional areas, varying along the segment's length through a range between a minimum size at opposite ends of the segment and a maximum size at the approximate midpoint thereof, which range encompasses the core and cladding dimensions of the fibers to be coupled. Such an optical fiber segment can be drawn from an optical preform having the desired core and cladding geometry by varying the fiber drawing speed to achieve the desired variations in core and cladding dimensions. Thereafter, the drawn fiber can be severed at appropriate minimum dimension points along its length to provide a coupling device having the same general core and cladding geometry as the fibers to be coupled but with the core and cladding dimensions, and their corresponding cross sections, tapering from the maximum size fiber to be coupled at the midpoint of the segment to opposite ends of a size at least as small as the smallest of optical fibers to be coupled.

Two optical fibers having the same core and cladding geometry but with different core and cladding dimensions may be coupled by selecting a coupling device of corresponding geometry. One end of the coupling device is severed along its length at a point where the core and cladding dimensions best match that of one of the fibers to be coupled. In a similar manner, the other end of the coupling device is severed to best match the core and cladding dimensions of the other fiber to be coupled. The two fibers are then butt coupled to the respective "matched" ends of the coupling device. The light transfer efficiency of the coupling device can then be determined by laterally coupling a test fiber onto the coupling device and injecting test light into the coupling device while measuring the light output from the other end of the coupled fibers.

A principal objective of the present invention is, therefore, the provision of improved methods and devices for effecting efficient coupling of optical fiber waveguides, particularly where the optical fiber waveguides may have differing core and cladding dimensions. Other objects and further scope of applicability of the present invention will become apparent from the detailed description to follow, taking in conjunction with the accompanying drawings, in which like parts are designated by like reference characters.

BRIEF DESCRIPTION OF THE DRAWING

FIG. 1 is an end view of an optical fiber having a centrally located circular core and a concentric cladding surrounding the core;

FIG. 2 illustrates an examplary butt coupling between optical fibers of differing core and cladding cross sectional areas;

FIG. 3 is an end view of an optical fiber having two spaced, web-supported cores;

FIG. 4 is an isometric projection of a preform from which an optical fiber may be drawn;

FIG. 5 is a side view of an exemplary starting fiber for manufacturing coupling devices in accordance with the present invention and illustrates successive enlarged and reduced diameter portions;

DESCRIPTION OF THE PREFERRED EMBODIMENT

Figure 6:
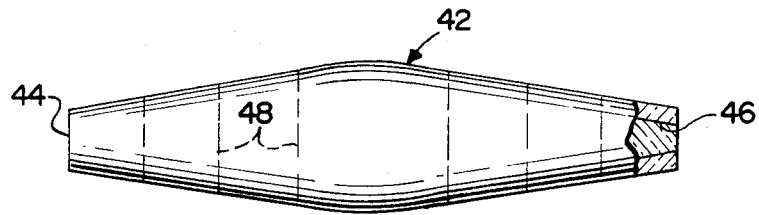
FIG. 6 is a side view of an optical fiber coupling device in accordance with the present invention.

An exemplary optical fiber waveguide that can be coupled in accordance with the present invention is illustrated in transverse cross section in FIG. 1 and designated generally therein by the reference character 10. As shown, the optical fiber 10 includes a centrally located circular core 12 having a nominal core diameter "d" and a concentric cladding layer 14 that surrounds the core 12 and has a nominal outside diameter "D" to thus provide an optical fiber having a selected core and cladding geometry and associated cross sectional area. The core diameter "d" for the smaller single-mode fibers can range between 2–5 microns while the cladding diameter "D" can range between 10 and upwards of 100 microns. As is known in the art, optical fiber manufacturing is such that an optical fiber can have core and cladding diameters and associated cross sections areas that vary along the length of the fiber due to imperfections in currently available drawing techniques. In addition optical fibers of the same type fabricated during different production runs by the same manufacturer and from different manufacturers can likewise vary in diameter and cross sectional area.

In conventional butt coupling of optical fibers, the differences in core and cladding diameters and relative cross sectional areas can result in a mismatch between the end-to-end coupled fibers that can diminish optical energy transmission through the coupling. For example and as shown in FIG. 2, an optical fiber 16 having a core 18 of a first relative diameter is end-to-end coupled to another optical fiber 20 having a somewhat smaller core 22. As can be appreciated, a portion of the light energy propagated in the larger core 18 of the optical fiber 16 will not be presented to and will not enter the smaller core 22 of optical fiber 20. The coupling loses will be a function of the difference in cross sectional areas between the larger and smaller coupled cores. The same coupling mismatch problems described above in connection with the optical fiber geometry illustrated in FIG. 1 occurs where the fiber geometries are more complex including, for example, the fiber 24 of FIG. 3 which includes dual, web-supported cores 26 and 28.

In accordance with the present invention, a coupling device suitable for effecting efficient end-to-end coupling between optical fibers which accomodates the variance in diameters and cross sections between the optical fibers is fabricated by first forming a preform having the same general cross sectional geometry of the fibers to be coupled. As shown in FIG. 4, a preform 30 may be formed having a central core region 32 and surrounding cladding region 34. The preform 30 may be formed by one of several known methods including the chemical vapor depositon technique. One end of the preform 30 is inserted into a furnace (not shown) and, as shown in FIG. 5, a continuous starting fiber 36 is drawn having the same general cross sectional geometry as that of the preform 30. As shown in the side view of FIG. 5, the diameter dimension of the starting fiber 36, and the associated cross sectional areas, varies in a continuous and preferably periodic manner between smaller, minimum diameters and associated cross sections, as represented by dashed lines 38 in FIG. 5, and larger, maximum diameters and associated cross sections, as represented by the dashed lines 40. The variation in cross section of the starting optical fiber 36 can be achieved, for example, by varying the drawing speed of the starting optical fiber 36 as it is drawn from the preform 30 to thus produce the alternately smaller and larger cross sections. The dimensional range through which the cross section of the starting fiber 36 varies depends upon the range of expected cross sectional variations for the fibers to be coupled. For example, where the optical fibers to be coupled have nominal outside diameters of 8 microns but can be expected to vary on a run to run basis from the same manufacturer or vary from manufacturer to manufacturer from 7 microns through 9 microns, the starting fiber 36 can be drawn to have a minimum cross section of 6 microns and a maximum cross section of 10 microns to thus accomodate the entire range of expected cross sections for the fibers to be coupled. The axial distance between minimum diameter cross sectional portions of the starting optical fiber 36 is not particularly critical although axial lengths of 5 through 50 cm. between minimum diameter sections 38 are satisfactory.

After the starting fiber 36 is fabricated, it is severed at the minimum diameter sections 38 to thus form a plurality of coupling devices 42, as shown in side view in FIG. 6. The opposite ends 44 and 46 of each coupling device 42 have minimum core and cladding cross sectional areas with the cross section varying continuously to a maximum cross section in the central region. In FIG. 6 and in FIGS. 7 and 8, the structures have been shown out of proportion to better illustrate the invention. If desired, each coupling device 42 can be provided with axially spaced circumferential indicia 48 or other marks to indicate the corresponding cross section. In the example presented above and as illustrated by the dotted lines in FIG. 6, a coupling device 42 can be marked with indicia 48 to indicate changes in diameter in one micron increments, for example, 5, 6, 7, 8, 9, 10, and 11 microns.

Figure 7:
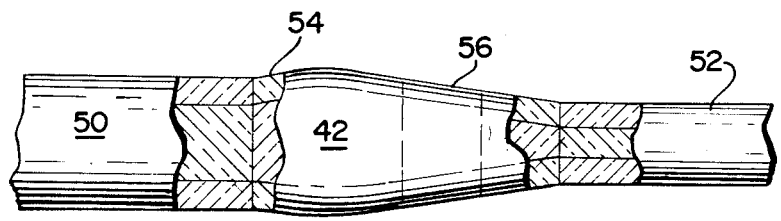
FIG. 7 is a side view of two optical fibers coupled with a coupling device in accordance with the present invention.

In utilizing a coupling device 42 prepared in the manner described above for coupling two optical fibers, such as the optical fiber 50 and the optical fiber 52 of FIG. 7, the core diameter or cross section of the first optical fiber 50 is determined, for example, by optical inspection and, in a like manner, the core diameter or cross section of the second optical fiber 52 is likewise determined. A coupling device 42 is then selected having the same geometry of the fibers 50 and 52 and minimum and maximum dimensions that are smaller and larger, respectively, then that of fibers to be coupled. The coupling device 42 is prepared by first severing it on one end at a point along its length that corresponds to the measured cross section of the first optical fiber 50 to provide a first severed end 54. In a like manner, the opposite end of the coupling device 42 is severed at a point along its length that corresponds to the cross section of the second optical fiber 52 to define a second severed end 56. In severing the opposite ends 54 and 56 of the coupling device 42, the ends are preferably severed in planes transverse to the longitudinal axis. Thereafter, the first optical fiber 50, as shown in FIG. 7, is butt coupled to the first severed end 54 of the coupling device 42 and the second optical fiber 52 is butt coupled to the other severed end 56 of the coupling device. As can be appreciated, the butt couplings between both of the fibers 50 and 52 and the opposite ends 54 and 56 of the coupling device 42 are well matched in terms of physical dimensions to thus provide an efficient butt coupling.

Figure 8:
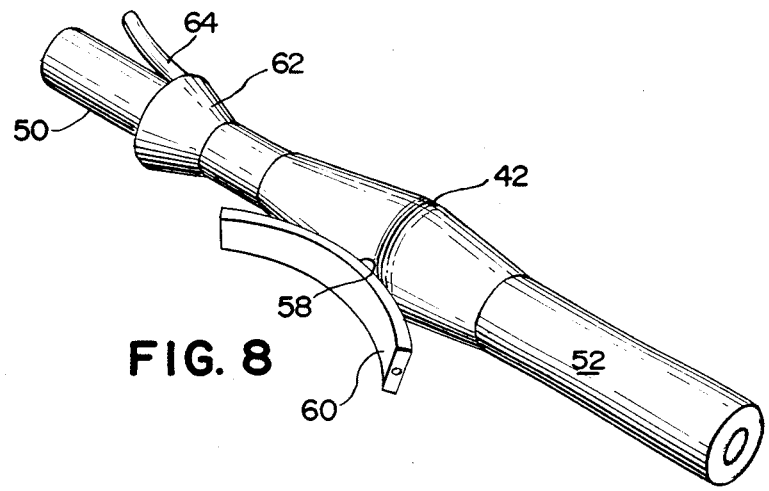
FIG. 8 is a side view of coupled optical fibers illustrating arrangements for determining the optical coupling efficiency of the coupling device.

In effecting butt-type couplings is often times desirable to measure the coupling efficiency as the coupling is being effected. This in-process optical efficiency determination can be achieved, as shown in FIG. 8, by utilizing a temporary lateral coupling 58 by which a tap fiber 60 is laterally coupled to the coupling device 42. Such lateral fiber couplings are disclosed in applicant's commonly assigned U.S. Pat. No. 4,315,666 for COUPLED COMMUNICATIONS FIBERS, the disclosure of which is incorporated herein to the extent necessary to practice the present invention. In order to determine the coupling efficiency of the coupling device 42, a test light having known characteristics can be propagated in either the core of the optical fiber 50 or the optical fiber 52 while monitoring the light from the laterally coupled tap fiber 60. The butt connection between the optical fibers 50 and 52 and the coupling device can then be adjusted to provide maximum energy transfer. In the alternative, test light having known characteristics can be introduced into the coupling device 42 through the laterally coupled tap fiber 60 with the magnitude of the light output from both the optical fibers 50 and 52 analyzed to determine the coupling efficiency. In addition to utilizing the laterally coupled tap fiber 60 illustrated in FIG. 8, it is also possible to provide a coupling collar 62, and an associated tap fiber 64 to assist in making the efficiency determination. The coupling collar 62 surrounds one of the coupled optical fibers, optical fiber 50 in the case of the example of FIG. 8, and is effective to strip light energy from the cladding of the optical fiber 50. Test light of known characteristics is introduced into the coupling device 42 through the laterally coupled tap fiber 60 with that portion of the light stripped from cladding of the optical fiber 50 by the collar 62 and presented through the fiber 64 representing that portion of the light energy of the light energy that is not transferred to the core of the optical fiber 50.

Thus it will be appreciated from the above that as a result of the present invention, a highly effective universal coupling link and methods for manufacturing the link and effecting an improved coupling between optical fibers is provided by which the principal objective, among others, is completely fulfilled. It will be equally apparent and as comtemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A method of coupling two optical fibers comprising the steps of:
   providing an optical fiber segment of selected length having a cross-sectional geometry corresponding to that of the two fibers to be coupled, the cross sectional geometry varying along its length from a minimum through a maximum and to a minimum and including that of the fibers to be coupled;
   severing a first end of the optical fiber segment transverse to its longitudinal axis at a point along its length where the cross sectional geometry thereof corresponds with that of a first optical fiber to be coupled;
   severing a second end of the optical fiber segment transverse to its longitudinal axis at a point along its length where the cross sectional geometry thereof corresponds with that of a second optical fiber to be coupled;
   butt coupling the first and second optical fibers to the respective first and second severed ends of the optical fiber segment; and,
   measuring the optical coupling efficiency of the coupled first and second optical fibers.

2. The method of claim 1, wherein said measuring step further comprises:
   laterally coupling a tap optical fiber to the optical fiber segment;
   introducing test light into the tap optical fiber; and
   measuring the light output of at least one of the first or second coupled optical fibers.

3. The method of claim 2, further comprising the step of:
   stripping light energy from the cladding of at least one of the coupled optical fibers; and
   measuring the light energy stripped during the stripping step.

* * * * *